Fig.1

Inventor
Charles K. Woodman
By his Attorney

June 12, 1962 — C. K. WOODMAN — 3,038,182
ASSEMBLING AND UPPER SHAPING MACHINES
Filed Dec. 24, 1959 — 12 Sheets-Sheet 6

June 12, 1962 C. K. WOODMAN 3,038,182
ASSEMBLING AND UPPER SHAPING MACHINES
Filed Dec. 24, 1959 12 Sheets-Sheet 7

June 12, 1962    C. K. WOODMAN    3,038,182
ASSEMBLING AND UPPER SHAPING MACHINES
Filed Dec. 24, 1959    12 Sheets-Sheet 8

June 12, 1962     C. K. WOODMAN     3,038,182
ASSEMBLING AND UPPER SHAPING MACHINES
Filed Dec. 24, 1959     12 Sheets-Sheet 12

Fig.25

United States Patent Office 3,038,182
Patented June 12, 1962

3,038,182
ASSEMBLING AND UPPER SHAPING MACHINES
Charles K. Woodman, Beverly, Mass., assignor to United Shoe Machinery Corporation, Flemington, N.J., a corporation of New Jersey
Filed Dec. 24, 1959, Ser. No. 861,890
21 Claims. (Cl. 12—1)

This invention relates to shoe machines and is herein illustrated as embodied in a heel end assembling and upper shaping machine. The illustrated machine is of the same general type as that disclosed in United States Letters Patent No. 2,059,241, granted November 3, 1936 on an application filed in the name of Jacob C. Jorgensen, but containing certain features disclosed in United States Letters Patent No. 2,085,755, granted July 6, 1937 on an application filed in the name of said Jorgensen. It is to be understood, however, that the invention is not limited to machines of the illustrated type but in certain aspects thereof is applicable to other types of shoe machines.

It is an object of the present invention to provide a machine for assembling and shaping the heel end portions of shoe uppers which does not require the mounting of the shoe parts upon a last. The elimination of the last at the assembling operation not only reduces substantially the total number of lasts required for the production of a run of shoes, but it also facilitates the assembling of shoe parts by providing a small and compact work supporting assembly for mounting the heel end portions of the shoe materials in place of a relatively bulky last, the fore part of which serves no purpose whatever in the assembling and upper shaping operations performed by machines of the type herein illustrated. It is a further object of the invention to facilitate the assembling and upper shaping operation by providing for the retention of the shoe upper parts in assembled position of the work supporting means at the loading station in order to facilitate and expedite the operation of the machine and more specifically to liberate the hands of the operator for the manipulation of the controls of the machine.

It is a still further object of the invention to provide an upper shaping machine which will reliably provide shoes of higher quality than those heretofore obtainable, particularly with respect to the shaping of the heel end portions of shoe uppers in the area adjacent to the feather line.

With the above and other objects in view as will hereinafter appear, the present invention, in one aspect thereof, contemplates the provision in a machine for shaping the heel end portions of shoe uppers off the last of a work support characterized by means for mounting any one of a plurality of insole supporting plates and characterized further by members which, together with a plate on the support, define a cross sectional contour of the heel end portion of a shoe upper. Such an organization provides a simple and convenient arrangement whereby the machine can be adapted to operate on different sizes and styles of shoes by providing a run of sizes of plates and providing for the mounting of said plates alternatively on the work support. By this simple expedient, the machine is rendered operable on a wide variety of styles and a complete run of sizes. For clamping the heel end portion of a shoe upper against the work support, the present invention provides means herein illustrated as a pair of jaws for bringing a shoe upper into intimate contact with the edge face of the plate and the outer faces of the members which define the cross sectional contour of the upper.

The illustrated work supporting assembly includes with the supporting plate an inner form arranged to engage the back line portion only of a shoe upper on the supporting assembly. The inner form co-operates with the members above referred to to position the heel end portion of the upper for the wiping operation and the subsequent fastening of the overwiped margin to the insole. The illustrated inner form depends from the plate and is preferably adjustable to suit different angular dispositions of the heel end portion of the insole to the back line of the upper. The illustrated organization provides, in combination with the insole supporting plate, a pair of gripper elements or jaws arranged to engage the inner and outer surfaces, respectively, of the upper at one side of its heel portion, said jaws extending heightwise of the upper from its top edge more than half the distance to the overlasting margin and preferably to the area engaged by the edge face of the insole supporting plate, and being characterized by the concavo-convex structure of their surfaces defining a predetermined cross sectional curvature of the heel end portion of a shoe upper. In the illustrated organization, the jaws which engage the inner portion of the upper comprise a pair of arms shaped to define a heel end contour of the upper extending from the insole supporting plate to the top line of the upper. These arms are initially brought into a position of conformity with the plate to provide a composite form on which the upper is mounted. The arms are hinged for swinging movement toward and from each other to adjust them to receive uppers of different widths. In the illustrated organization the arms are positioned by their engagement with abutment surfaces formed in the insole supporting plate. Preferably, the abutment surfaces are so disposed that the arms form with the plate a substantially continuous uninterrupted upper engaging surface. In order to cause any fullness in the upper to be worked progressively from the top edge toward the lasting margin by the closing of the gripper members at opposite sides of the heel portion of the upper the members engaging the outer surface of the upper are characterized by resilient upper engaging means so disposed that they engage the upper progressively beginning at the top line and advancing toward the lasting margin The illustrated work supporting assembly is carried by a jack mounted for swinging movement from a loading station into an operating station. The swinging movement of the jack is effected by fluid pressure operated means as is also the closing of the jaws which engage the outer surface of the heel end portion of the upper and a suitable actuator is provided for first causing the advancement of the jaws into clamping engagement with the upper and thereafter causing the movement of the jack from the loading station to the operating station. After the jack has been swung into the operating station the work supporting assembly is movable upwardly relatively to the jack thereby to bring the assembly into an operating relation to the wipers determined by the engagement of an insole on the supporting plate with a holddown member. The upward movement of the work supporting assembly is effected by a pressure fluid operated piston carried by the jack, and the holddown is movable downwardly into operating position by a pressure fluid operated piston which overcomes the upward pressure against the work supporting assembly and causes the assembly to be vertically positioned relatively to the wipers by means determining the operating position of the holddown.

In accordance with a feature of the invention, the wipers are caused to dwell in their advanced or overwiped position while heavy fluid pressure is applied to the piston carried by the jack, thereby to effect a bedding of the overwiped margin of the upper against the insole by sustained pessure of the work against the wipers.

In order to bring the heel end portion of the upper into intimate contact with the edge face of the insole supporting plate and the innermost of the upper clamping jaws preparatory to the wiping operation, the illustrated machine is provided with a novel heel band organization arranged to cooperate with the outer jaws to clamp the upper against the supporting members, said heel band organization being characterized by a flexible member for advancing the heel band, a spacer being provided between the heel band and the member, said spacer being so constructed that its inner edge face is in intimate contact with the heel band and its outer edge face is generally circular when the heel band is closed upon a shoe upper mounted on the plate. The heel band actuating member is operated by means constructed and arranged to apply to the end portions of the member forces generally tangential to the outer edge face of the spacer. In this manner a substantially uniform pressure of the heel band against the upper is achieved. The illustrated heel band is advanced and retracted at the will of the operator by pressure fluid operated means controlled by means herein illustrated as a manually operated lever.

These and other features of the invention will now be described with reference to the accompanying drawings and pointed out in the appended claims.

In the drawings:

FIG. 24 is a chart of the hydraulic organization; and

Figure 1:
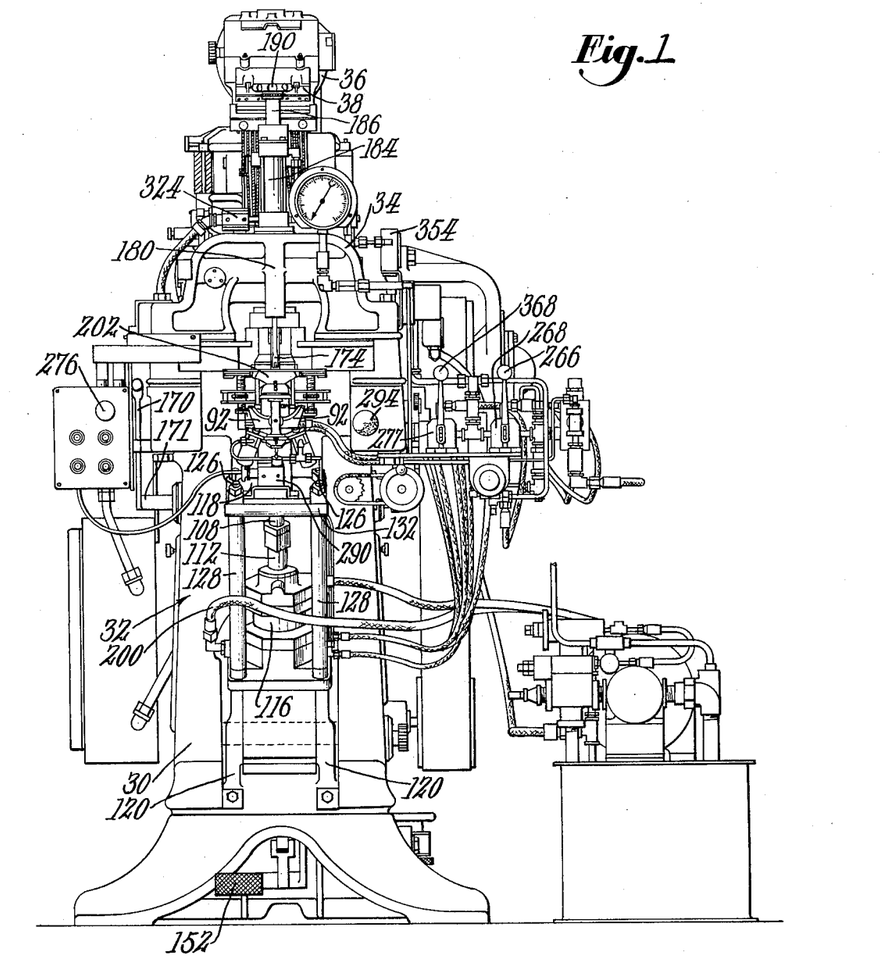
FIG. 1 is a front elevation of a machine embodying the features of the present invention.
Figure 2:
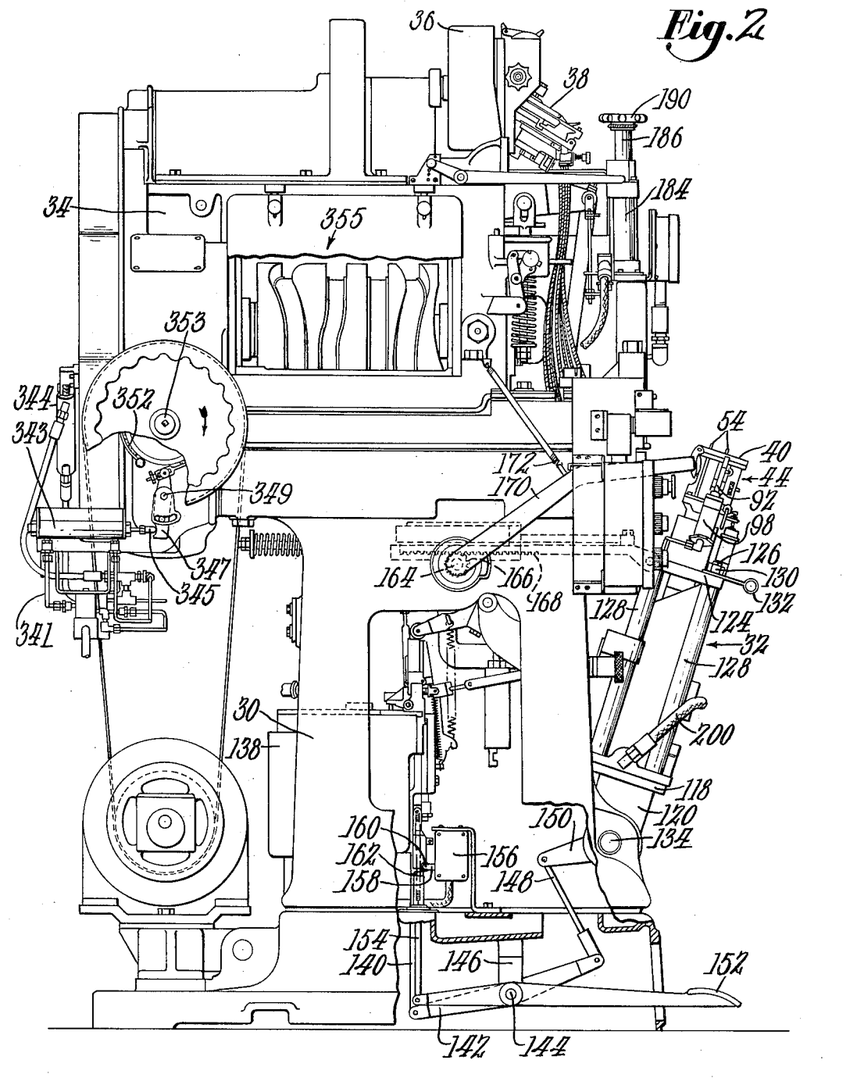
FIG. 2 is a left side elevation of the machine illustrated in FIG. 1, certain parts being broken away to disclose hidden parts.

The invention is illustrated in the drawings as incorporated in a machine of the type illustrated in the Jorgensen Patent No. 2,059,241, hereinbefore referred to. Referring to FIGS. 1 and 2, the illustrated machine comprises a base 30 on which a work supporting jack 32 is mounted for swinging movement from its work receiving position illustrated in FIG. 2 into an upright position in which the work is located in the operating station. Mounted on the base 30 is a head frame 34 in which is mounted the main cam and other operating parts of the machine. Mounted on the head frame is a super structure which mounts a tack pot 36 from which tacks are supplied through a suitable separating mechanism 38 to tack driving means (not shown) whereby the lasting margin of a shoe upper is permanently fastened to the heel end portion of an insole mounted on the jack.

Figures 5, 6, 7:
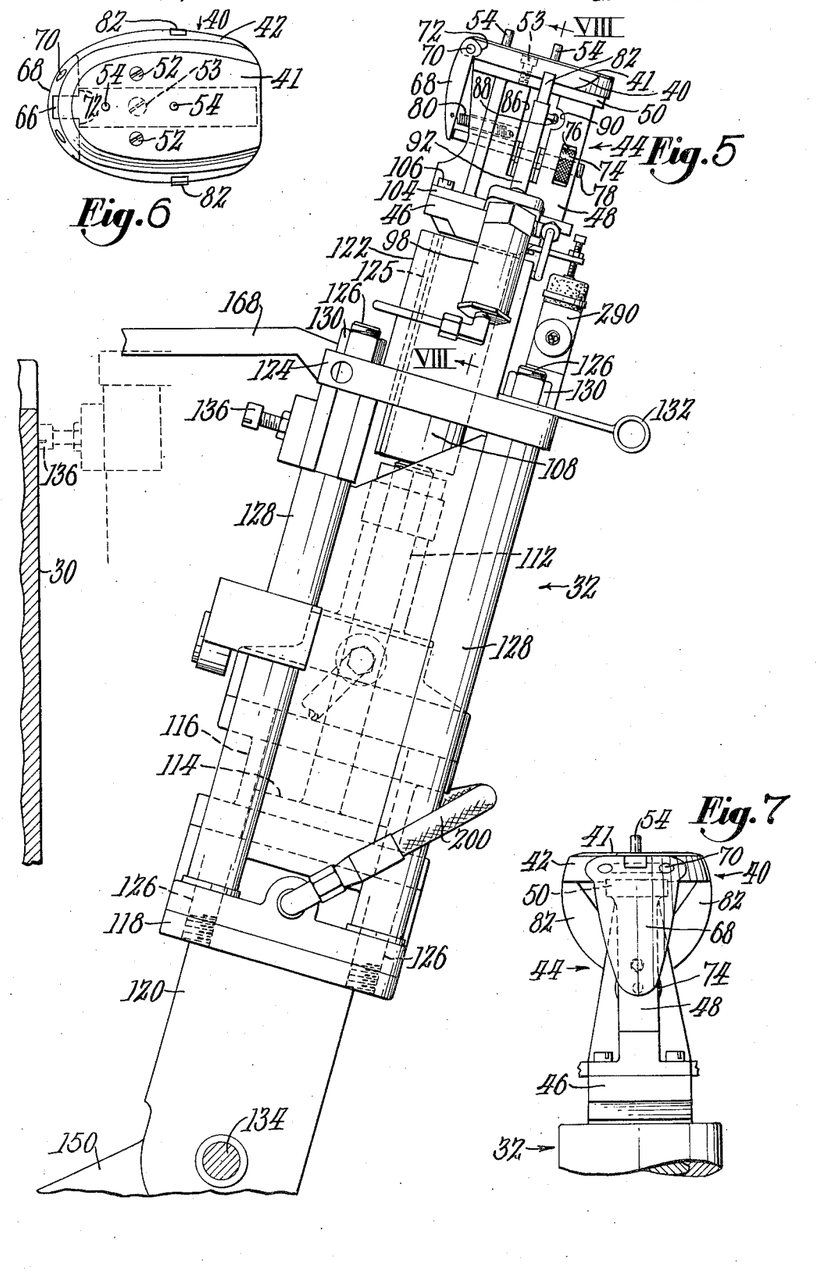
FIG. 5 is a left side elevation of the shoe supporting jack.
FIG. 6 is a plan view illustrating parts of the shoe supporting assembly in the upper portion of the jack.
FIG. 7 is a rear elevation illustrating particularly the parts shown in FIG. 6.
Figure 8:
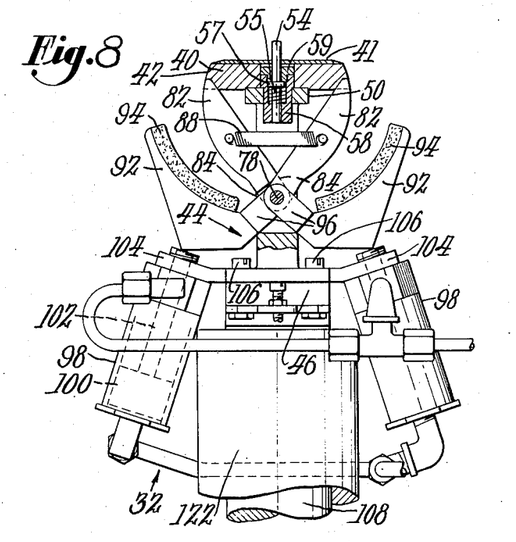
FIG. 8 is a front elevation of the upper portion of the jack partly in section along the line VIII—VIII of FIG. 5.

Referring to FIG. 5, the illustrated jack is provided with a plate 40 which supports the heel end portion of an insole for the wiping and tack driving operations hereinafter described. As shown in FIGS. 5 and 6, the illustrated plate comprises a relatively thick base portion and a thin upper portion or cap 41 which is attached to the base portion by two screws 52. The plate has a peripheral contour corresponding substantially to the shape of the heel end portions of insoles in a range of sizes to be mounted thereon. As shown in FIG. 7, the edge face 42 of the plate has a contour corresponding substantially to the contour of that portion of the heel end of a lasted shoe upper adjacent to the feather line. The illustrated machine is provided with a plurality of such plates in a range of sizes. For the usual run of work, three plates have been found to be sufficient. For supporting alternatively any one of said plates, the illustrated work supporting jack carries in its upper portion a standard 44 (FIG. 7) comprising a base 46, an upright portion 48 and a head 50. As shown in FIG. 8, the head 50 is seated in a shallow groove in the base of the plate 40, the plate being secured thereto by a screw 53 (FIG. 6). The registration of an insole on the plate 40 is determined by two pins 54 projecting upwardly from the plate 40 through suitable apertures in the heel end portion of the insole. In order to obviate the removal of insole substance to provide for the mounting of the insole on the pins 54, tongues 56 (FIGS. 9 and 10) are punched in the heel end portion of the insole on its longitudinal median line to provide for the mounting of the insole upon the pins. In the course of the shoe bottoming operations, the tongues 56 are returned to their normal positions in the plane of the insole leaving the foot contacting surface of the insole substantially unbroken. Referring to FIG. 8, each pin is mounted in a cylindrical plug 58 which is fixedly mounted in a socket in the upper extremity of the standard. The plug 58 is axially bored to mount the lower portion of the pin 54 for sliding movement therein and the plug is counterbored to receive a spring 55 which surrounds the pin and is confined between a flange 57 on the pin and the base of the counterbore. The spring urges the flange upwardly against the hub of a cap 59 which is threaded into the upper end portion of the plug. The cap 59 has the same diameter as the plug and the assembly is received within a suitable bore in the plate 40 when the plate is mounted upon the standard. The upwardly projecting end portion of the pin 54 extends through a suitable aperture in the cap 41. The yielding mounting of the pins 54 permits them to retract under the action of a holddown member hereinafter described if need be. It will be understood that the position of the pins 54 relatively to the plate 40 corresponds to the positions of the apertures punched in the insole.

Pivotally mounted on a tongue 66 (FIG. 6) formed in the plate 40 is an inner form 68 which has a contour substantially complemental to the inner contour of the heel end portion of a shoe in the size range for which the plate 40 is designed. The inner form is pivotally mounted on a cross pin 70 carried by the tongue 66. As shown in FIGS. 5 and 6, the inner form 68 is provided with forwardly projecting ears 72 which are spaced to receive the tongue 66 between them and are bored to receive the cross pin 70. The ears are shaped to form in conjunction with the plate 40 the shape of the heel end portion of a shoe. Referring to FIG. 7, the inner form 68 is centrally located widthwise thereof relatively to the standard 44 so that it engages an area of the heel portion of the upper extending in opposite directions from the back line, this area being hereinafter referred to as the back line portion of the upper. Inasmuch as the angular disposition between the back line portion and the plane of the heel end portion of the insole varies with different types and styles of shoes, provision is made for the angular adjustment of the inner form 68 relatively to the insole mounting plate 40. As shown in FIG. 5, this adjustment is effected by turning a knurled cylindrical nut 74 contained within a slot 76 formed in the standard 44 and mounted on the threaded end portion of a rod 78 slidably mounted in a bore in the standard, the bore and the slot 76 being so arranged that the rear end of the rod contacts the lower end portion of the inner form 68. The inner form is held against the end of the rod by the tension of a spring 80, the rear end of which is anchored to the inner form and the forward end to a pin projecting from the standard.

Figure 18:
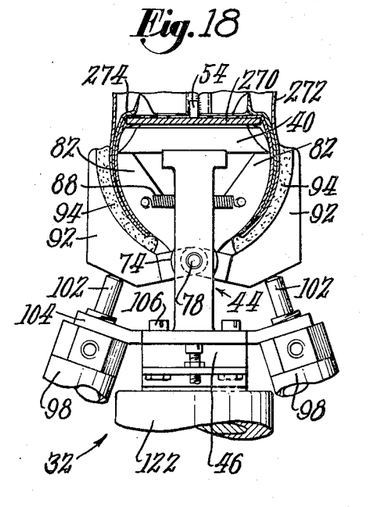
Figure 19:
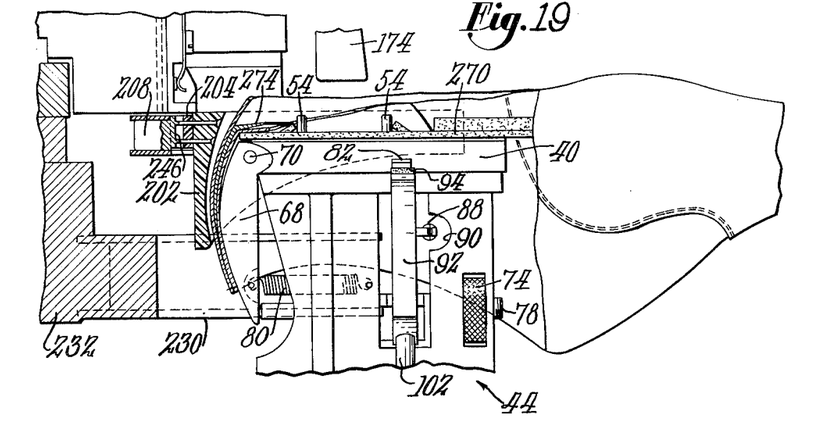
FIGS. 19, 20 and 21 are left side elevations illustrating the upper portion of the jack together with the heel band and the holddown at different stages in the operation of the machine, the heel band and the shoe parts being shown in section on the plane of the longitudinal median line of the rear portion of an insole on the jack.
Figure 20:
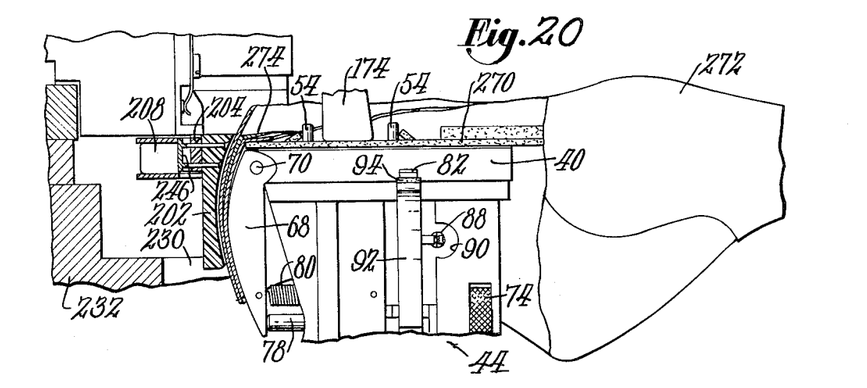
Figure 21:
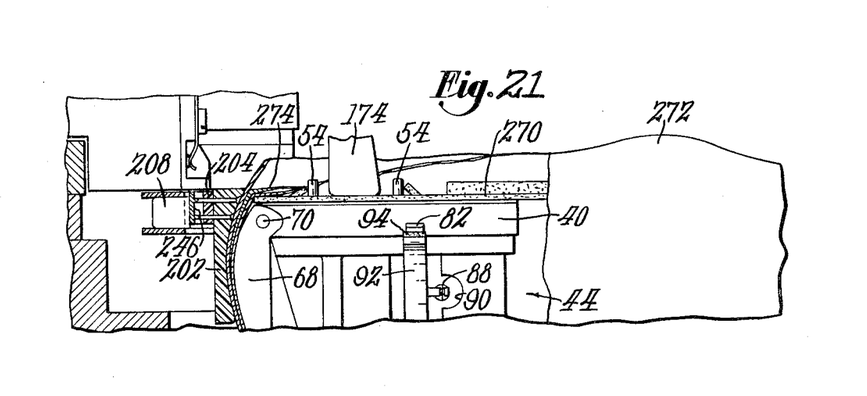

In order to determine the position of opposite sides of the heel portion of an upper for the wiping and tacking operations, a pair of side forms 82 is provided. Referring to FIG. 8, the side forms have tongues 84 extending downwardly therefrom and overlapping each other to provide a halved joint which is drilled for pivotal mounting on the rod 78. Referring to FIG. 5, the lower portions of the side forms extend into an open ended slot 86 formed in the standard and extending upwardly from a point near its base. The side forms are urged toward each other by the tension of a spring 88, the opposite ends of which are anchored respectively to pins projecting forwardly from the side forms. As shown in FIG. 5, a semi-cylindrical recess 90 is formed in the standard to receive the spring. In their normal position, the side forms 82 are arranged as shown in FIG. 8 with their upper end portions seated in suitable notches provided in the insole mounting plate 40 and with their outer edge faces substantially tangential to the edge face 42 of the plate 40. The edge face of the plate, combined with the convex outer edge faces of the side forms 82, provide an assembly against which opposite sides of the heel end portion of a shoe upper are gripped or clamped by means hereinafter described. The position of the heel end portion of an upper clamped to the assembly is illustrated in FIG. 18. In this position, the top line portions at opposite sides of the heel end of the upper are curved inwardly toward each other to a substantially greater degree than the normal inward curvature of that portion of the upper when it is subsequently mounted on the last. By so mounting the heel end portion of the upper, the heightwise dimension of the lining from the top line to the lasting margin is shortened relatively to the corresponding dimension of the upper, thus insuring a tensioning of the lining by the subsequent insertion of the last into the upper. Such tensioning of the lining urges the top line inwardly at opposite sides of the heel portion and causes the shoe to fit snugly against the ankle of the wearer.

Figure 17:
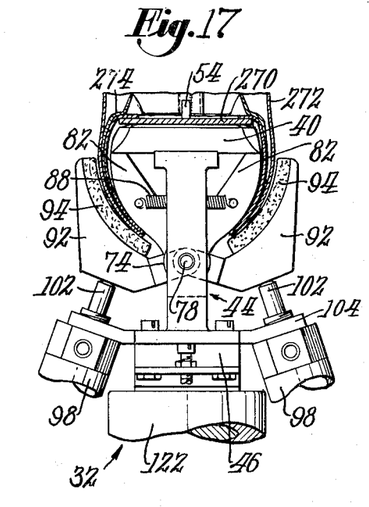
FIGS. 17 and 18 are front elevations similar to FIG. 16 with the side clamps shown in different stages in their closing movement.

For gripping or clamping opposite sides of the heel end portion of the upper against the side forms 82, the illustrated machine is provided with a pair of presser members or gripper jaws 92 (FIG. 8) having concave inner surfaces complemental in shape to the convex outer surfaces of the side forms 82. In the illustrated organization, the inner surfaces of the jaws are provided by pads of resilient flexible material of substantial thickness such, for example, as vulcanized rubber, identified in FIG. 8 by the numeral 94. The jaws 92 are provided with arms 96 extending inwardly with an upward inclination and having therein, portions bored for pivotal mounting on the rod 78. In their closing movement, the jaws 92 first engage the upper at the top line and as their closing movement continues, the area of engagement of the pads 94 with the upper advances progressively from the top line toward the lasting margin, thus obviating the likelihood of confining any looseness in either the upper or the lining between the jaws 92 and the side forms 82. For operating the jaws 92, the illustrated machine is provided with two cylinders 98 arranged in upwardly converging relation to each other and having mounted therein, pressure fluid operated pistons 100 having rods 102 projecting upwardly into engagement with the outer extremities of the bottom edge faces of the jaws. The cylinders 98 are secured respectively to the upwardly bent end portions of a crosshead 104 secured by headed screws 106 to the base 46 of the standard 44. The progressive closing movement of the jaws 92 is illustrated in FIGS. 17 and 18. FIG. 17 showing the position of the jaws at their initial contact with the upper and FIG. 18 showing the position of the jaws upon the completion of their closing movement. The base 46 of the standard 44 has a shaft 108 extending downwardly therefrom. At its lower end the shaft bears against the upper end portion of a piston rod 112 (FIG. 5). The head 114 of the piston operates in a cylinder 116 secured to a crosshead 118 which itself is secured to two parallel vertical arms 120 which form the lower extremity of the jack. The shaft 108 is slidably mounted in a tubular member 122 projecting upwardly from a crosshead 124 and is held against rotation therein by a spline 125. The two crossheads 124 and 118 are secured together by four tie rods 126 to provide a unitary jack structure. The tie rods extend through four sleeves 128 which determine the space relation between the two crossheads. At their lower ends, the tie rods are threaded into the cross head 118 and their upper end portions extend freely through bores in the cross head 124 and are threaded to receive nuts 130 which are tightened to clamp the assembly into a rigid unitary structure. The forward nuts 130 also serve to attach a tubular handle 132 to the crosshead 124. At the lower extremities, the arms 120 are bored to receive a cross pin 134 (FIG. 2) on which the jack is mounted for swinging movement from its loading position illustrated in FIGS. 2 and 5 into an upright position in which the shoe parts mounted on the jack are presented to the wiping and tack driving instrumentalities. As shown in FIG. 2, the cross pin is mounted in forwardly extending portions of the base 30. The upright position of the jack is determined by the engagement of an abutment screw 136 (FIG. 5) carried by the jack with the forward portion of the machine base 30, the screw being adjustable to vary the angular position of the jack in the operating station.

For swinging the jack inwardly from the loading station to the operating station, the illustrated machine is provided with pressure fluid operated mechanisms generally similar to that illustrated and described in the Jorgensen Patent No. 2,085,755 hereinbefore referred to. Briefly described, the jack operating mechanism comprises a piston (not shown) mounted in a box-like structure 138 (FIG. 2) fixed in the machine base. The piston is connected by a link 140 to a lever 142 fulcrumed on a cross pin 144 in a fixed bracket 146, the lever being connected at its forward end to a link 148 connected to an arm 150 extending rearwardly from one of the arms 120. The operation of the piston is initiated by the depression of a treadle 152 fulcrumed on the cross pin 144 and connected by a link 154 to a valve which controls the operation of the piston. In order to provide for the closing of the jaws 92 while the jack is still in the loading station, a microswitch 156 is arranged to be operated by an initial depression of the treadle 152 prior to the operation of the piston. The operation of the microswitch operates through mechanism hereinafter described to cause the pistons 100 (FIG. 8) to close the jaws. As shown in FIG. 2, the microswitch 156 has an operating arm 158 projecting rearwardly therefrom and carrying a roll 160 positioned in the path of upward movement of a nut 162 on the treadle link 154. It will be understood that after the operation of the microswitch, the arm 158 continues to swing in a clockwise direction to provide clearance for the continued upward movement of the treadle link.

During the operating cycle of the machine, the jack is positively held against forward movement from its operating position by mechanism illustrated and described in the Jorgensen Patent No. 2,059,241, hereinbefore referred to. Briefly described, said mechanism comprises a pair of pawls mounted in a pawl carrier and arranged to engage a ratchet wheel (not shown) fixed to a cross shaft 164 (FIG. 2) mounted in bearings in the machine base. Also fixed to the shaft 164 is a pinion 166 which meshes with a rack bar 168, the forward end of which is pivotally connected to the jack. Freely mounted on the shaft 164 is a cam member (not shown) which is operable to disengage the pawls from the ratchet in order to permit the return of the jack to its loading station. For operating the cam the illustrated machine is provided with a hand lever 170 having a hub 171 (FIG. 1) freely mounted on the shaft 164 and coupled to the pawl releasing cam. The hand lever 170 is normally held by a spring 172 (FIG. 2) in its position illustrated in said figure. When the lever is in this position, the cams are disengaged from the pawls and the jack is locked in its operating position.

After the jack has been swung into its vertical position the piston 114 is operated to elevate the work supporting assembly into a position determined by the engagement of an insole on the plate 40 with an abutment member 174 (FIG. 3) fixed in a head 176 at the lower extremity of a piston rod 178. The head 176 is mounted for vertical sliding movement in a cylindrical structure 180 formed in the head frame 34, and a head 182 at the upper end of the piston rod operates in a cylinder 184 fixed to and projecting upwardly from the head frame. The operating position of the abutment member is adjustably determined by an internally threaded sleeve 186 mounted on the threaded upper end portion 188 of the piston rod. A hand wheel 190 is mounted on the sleeve to provide for the manual adjustment thereof, and a friction plug 192 is mounted in a radial bore in the hub of the hand wheel to hold the sleeve 186 in its adjusted position, a suitable garter spring 194 being mounted on the hub to apply pressure to the friction plug. The operating position of the abutment member is determined by the engagement of the lower extremity of the sleeve 186 with a head 196 at the upper extremity of the cylinder 184. The abutment member is moved downwardly into its operating position by pressure fluid conducted to a port in the head 196 through a suitable tube 198. Concomitantly with the downward movement of the abutment member, the work supporting assembly carried by the jack 32 is elevated by fluid pressure conducted to a port in the lower extremity of the cylinder 116 through a suitable tube 200 (FIG. 5). At this time, the fluid pressure is also exerted on the upper surface of the piston head 114 and the differential between the pressure below and the pressure above the piston head 114 is effective to elevate the work supporting assembly, but inasmuch as the effective upward pressure against the cylinder head 114 is less than the downward pressure upon the piston head 182, the elevated position of the work supporting assembly is determined by the abutment member 174.

Figure 3:
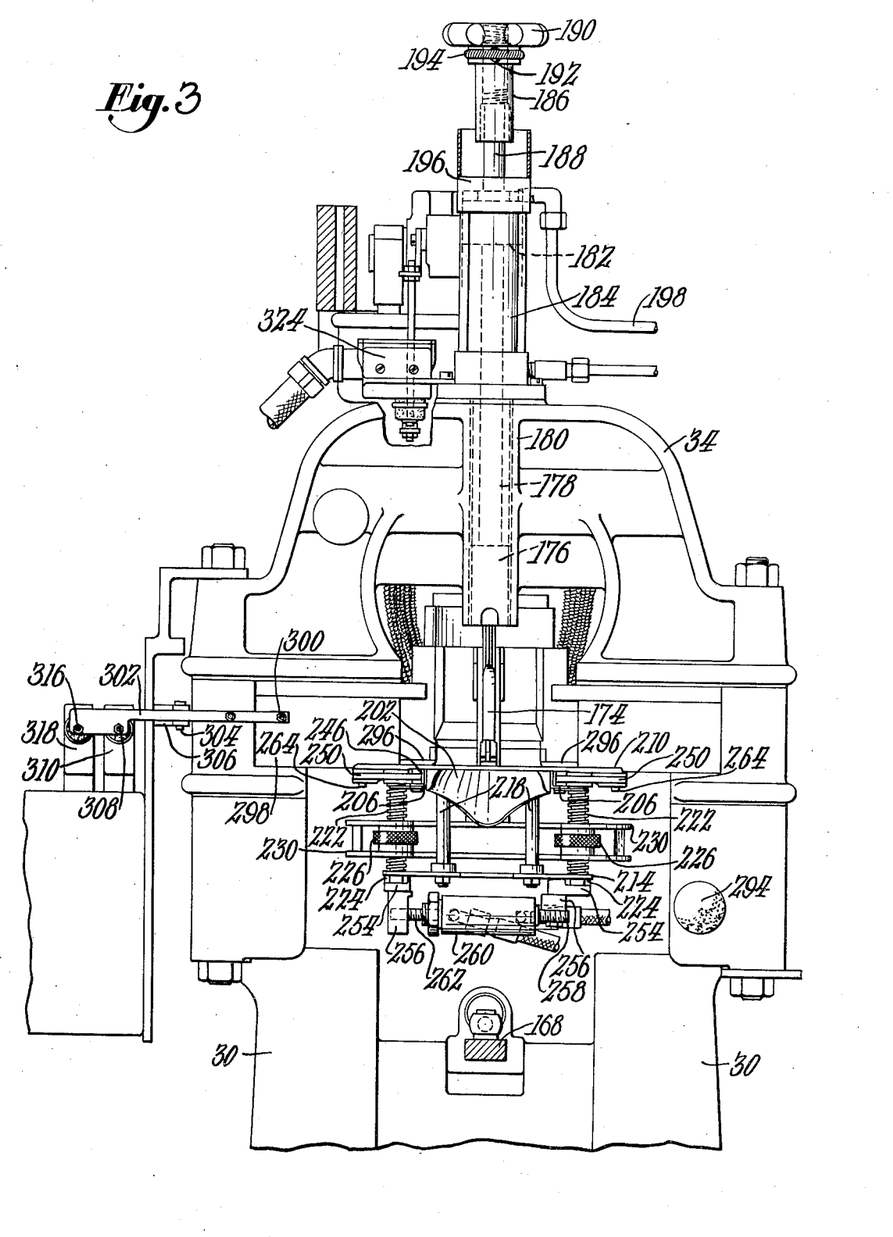
FIG. 3 is a front elevation of the upper portion of the machine on a larger scale than FIG. 1.
Figure 13:
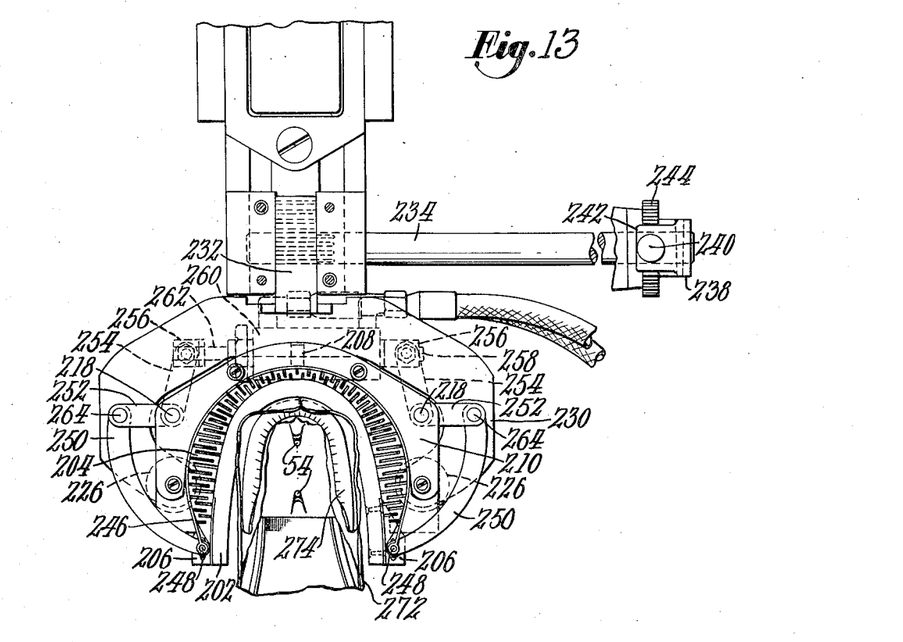
FIG. 13 is a plan view illustrating the heel band, parts of its mounting and operating means, and the heel end portions of an upper and an insole together with a counter mounted on the jack.
Figure 14:
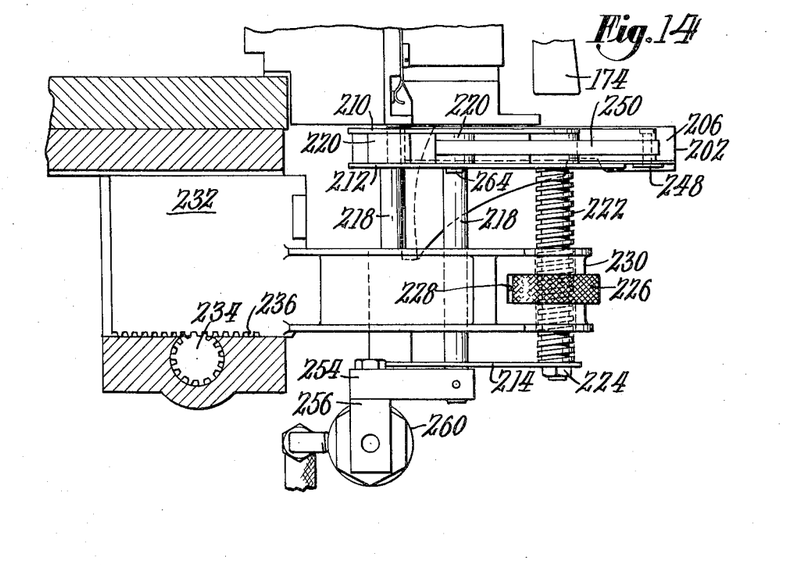
FIG. 14 is a left side elevation illustrating parts of the heel band mounting and operating means shown in FIG. 13.
Figure 15:
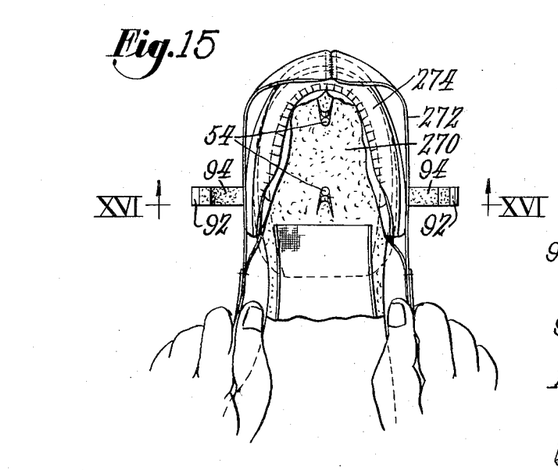
FIG. 15 is a plan view illustrating the heel end portions of an upper and an insole together with a counter mounted on the jack, the jack being in its forwardly swung position with the side clamps retracted.
Figure 22:
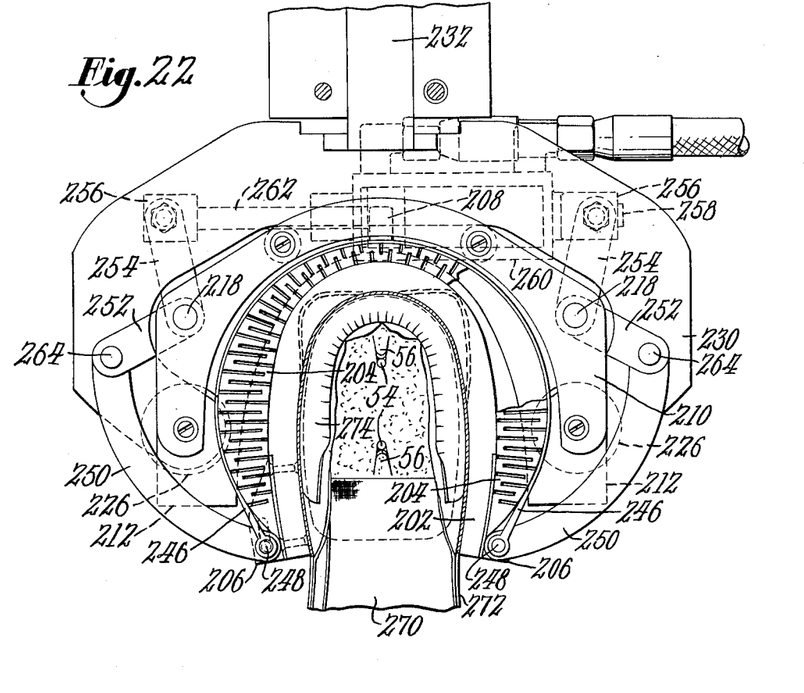
FIG. 22 is an enlarged plan view similar to FIG. 13 showing the heel band closed upon the heel end portion of a shoe upper mounted on the jack.
Figure 23:
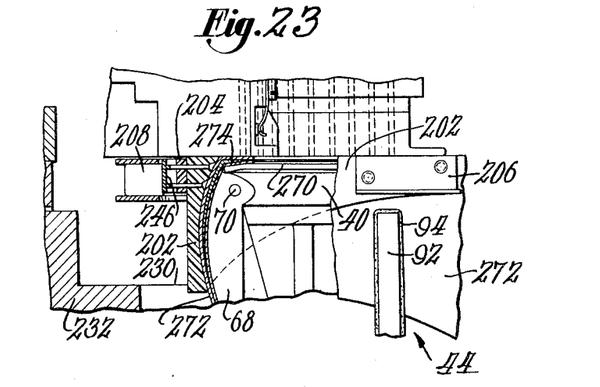
FIG. 23 is a view in left side elevation showing the heel band in its position illustrated in FIG. 22, the heel band being shown in section and the heel end portion of the upper being broken away to show part of the jack structure.

For clamping against the insole supporting plate 40 an assembly comprising a lined upper having a molded counter mounted in its heel end portion, the illustrated machine is equipped with a heel band 202 (FIG. 22) the back line portion of which, as shown in FIG. 3, is shaped to clamp the upper against the inner form and the forward end portions of which are shaped to clamp the opposite sides of the heel portions of the upper materials against the edge face of the plate 40. The illustrated heel band is a resiliently flexible member made of any suitable plastic material such, for example, as nylon. Surrounding the heel band 202 is a spacer member 204 which is also made of nylon and is provided throughout its length with a plurality of closely spaced transverse open ended slots extending alternately from its inner and outer surfaces to increase its flexibility. The inner surface of the spacer member is shaped to conform to the outer surface of the heel band 202 and the outer edge face of the spacer is so shaped that it is generally cylindrical when the heel band is closed on the upper. The end portions of the spacer member are supported upon angle brackets 206 secured to the forward ends of the heel band 202 and extending outwardly therefrom. The back line portions of the heel band and the spacer are secured to a block 208 which is slidably mounted between parallel plates 210 and 212 (FIG. 14) forming the upper portion of a carriage mounting the heel band organization. The plate 212 underlies the spacer member 204 throughout the greater part of its length and supports the heel band assembly against downward movement. The base of the carriage is herein illustrated as a plate 214 corresponding generally in shape to the plate 212. The space between the plates 212 and 214 is determined by a plurality of spacer members herein illustrated as vertical rods 218 and the space relation between the plates 210 and 212 is determined by collars 220 surrounding the rods 218. At their forward ends the space relation between the lower plate 214 and the upper plates 210 and 212 is determined by two threaded rods 222 (FIGS. 3 and 14) which carry clamping nuts 224 on their reduced lower extremities. Mounted on the threaded rods 222 are knurled cylindrical nuts 226 which are confined against vertical movement between the walls of horizontal open ended slots 228 formed in the end portions of a generally arcuate frame structure 230 which is I-shaped in cross section and is secured at its rear end portion to a horizontal slide 232 mounted in suitable ways in the machine frame. For adjusting the slide 232 forwardly and rearwardly, a shaft 234 is freely mounted in bearings in the machine frame and has pinion teeth cut in its left end portion and arranged to mesh with rack teeth 236 formed in the lower portion of the slide 232. As shown in FIG. 13, the right end portion of the shaft 234 extends outwardly from the machine frame and has a crank 238 secured thereto to provide for manual adjustment of the shaft. For locking the shaft in its adjusted position, a spring pressed detent 240 is mounted in an inward extension 242 of the crank and arranged to engage a toothed wheel 244 freely mounted on the shaft and fixed to an extension of the machine frame. For operating the heel band to clamp the shoe upper materials to the insole supporting plate 40 and the form 68, a flexible steel band 246 is arranged to surround the spacer member 204 and is secured together with the heel band and the spacer member to the block 208. At its forward extremities, the band 246 has cylindrical shapes formed therein to receive headed pins 248 which provide pivotal connections between the ends of the band and the forward end portions of two arcuate links 250. The links 250 are moved forwardly to operate the band 246 by the rotation of two foremost spacer rods 218 at opposite sides of the heel band, said spacer rods having secured to their upper end portions outwardly extending arms 252 which are pivotally connected to the rear end portions of the links 250. Referring to FIG. 14, said spacer members extend downwardly from the plate 214 and have secured thereto, arms 254. Swivelled on the free end of each of the arms 254 and extending downwardly therefrom is a block 256. As shown in FIG. 3, one of said blocks is secured to a stem 258 projecting from a hydraulic cylinder 260 while the other is secured to a piston rod 262 projecting from the cylinder. It will be seen that the operation of the piston imparts opposite movement to the arms 254, thereby swinging the arms 252 forwardly to cause the links 250 to operate the band 246. The disposition of pins 264 connecting the links 250 to the arms 252 and the pins 248 connecting the links to the band is such that when the heel band is closed on upper materials mounted on the plate 40, the force applied to the band 246 is substantially tangential to the then curvature of the outer edge face of the spacer member 204. This organization insures the application of substantially uniform pressure by the band 246 to the outer edge face of the spacer member 204 throughout its entire extent. The illustrated heel band 202 is closed and opened at the will of the operator by the operation of a hand lever 266 (FIG. 1) which operates a valve 268 which controls the operation of the piston 262 (FIG. 3.)

Figure 9:
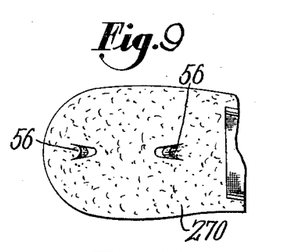
FIG. 9 is a plan view of the heel portion of an insole which has been punched for mounting on the work supporting means illustrated in FIG. 8.
Figure 10:
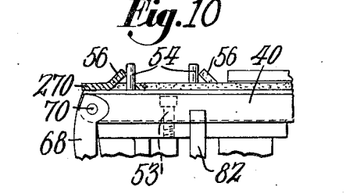
FIG. 10 is a detail view in left side elevation illustrating the work supporting means shown in FIG. 8 and the heel end portion of an insole mounted thereon.
Figure 11:
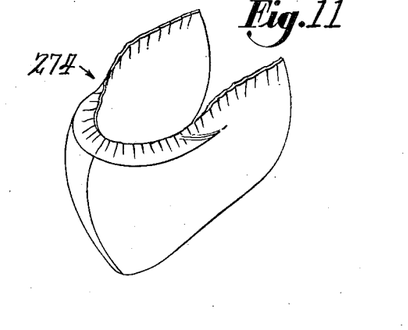
FIG. 11 is a perspective view of a flanged counter of the type employed in shoe uppers shaped in the illustrated machine.
Figure 12:
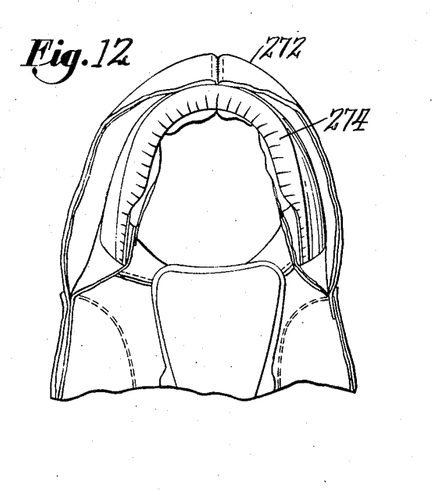
FIG. 12 is a plan view illustrating the heel portion of a shoe upper and a counter such as that illustrated in FIG. 11 inserted therein.
Figure 25:
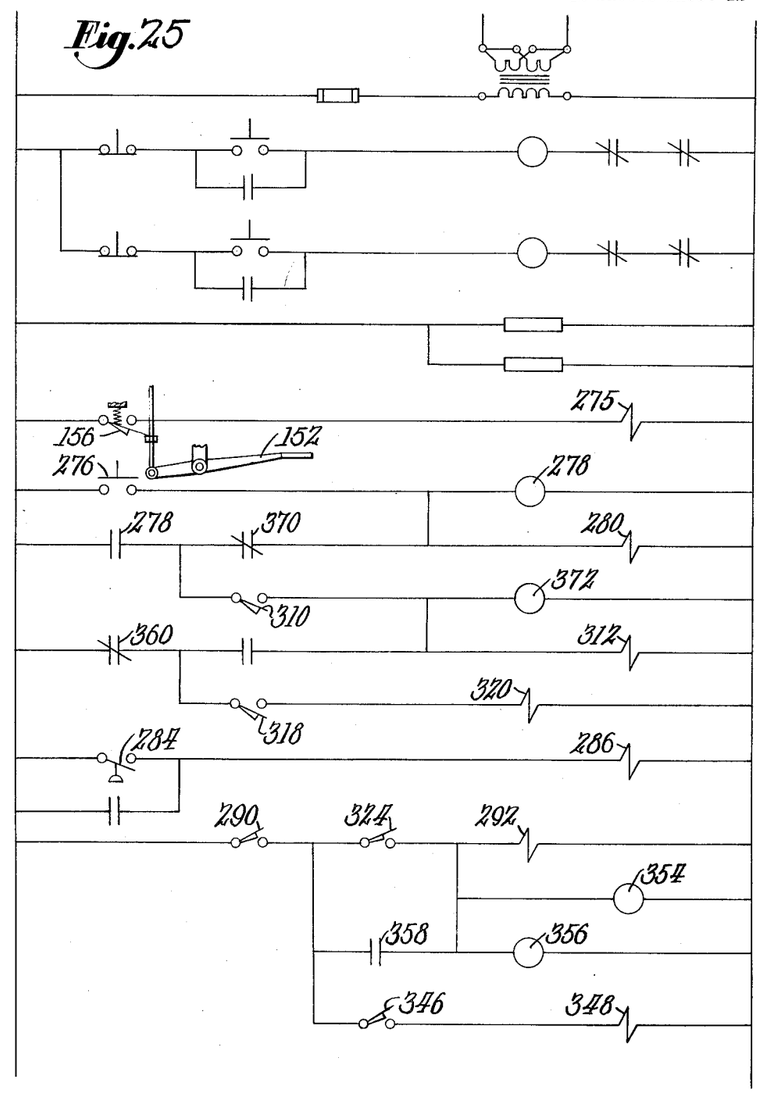
FIG. 25 is a wiring diagram.

In the operation of the illustrated machine, an insole such, for example, as the insole 270 partially illustrated in FIG. 9 is mounted on the plate 40 with the apertures in its heel portion in registration with the pins 54 (FIG. 10) and a shoe upper assembly such as the lined upper 272 partially illustrated in FIG. 12 and having mounted in its heel portion a molded counter such as the counter 274 illustrated in FIG. 11 is placed upon the insole with the flange of the counter and the lasting margin of the lining substantially contiguous to the insole. The operator then draws the rear portion of the upper forwardly about the plate 40 and the inner form 68 and holds the upper in this position while he depresses the treadle 152 (FIG. 2) to cause the operation of the microswitch 156 which energizes a solenoid 275 which in turn actuates a valve 277 (FIG. 24) to cause the pistons 100 (FIG. 8) to close the jaws 92 thereby to grip the opposite sides of the heel portion of the upper against the side forms 82 as shown in FIG. 18. After the jaws have been closed, the operator continues the depression of the treadle 152 to cause the operation of the fluid pressure operated means hereinbefore described which swings the jack 32 inwardly from its loading station illustrated in FIG. 2. The operator then operates a push button switch 276 (FIG. 25) which energizes the coil of a relay 278 to cause the operation of a solenoid 280 (FIG. 24) which actuates a valve 282 to cause the application of fluid pressure to the piston 182 (FIG. 3) which moves the abutment member 174 down into its operating position. When the pressure in the cylinder 184 has increased to a predetermined degree, a pressure switch 284 is closed to energize a solenoid 286 which actuates a valve 288 to cause the application of fluid pressure to both sides of the piston 114 (FIG. 5), thus causing the work supporting assembly to move upwardly to bring the insole on the plate 40 into contact with the abutment member 174.

Figure 4:
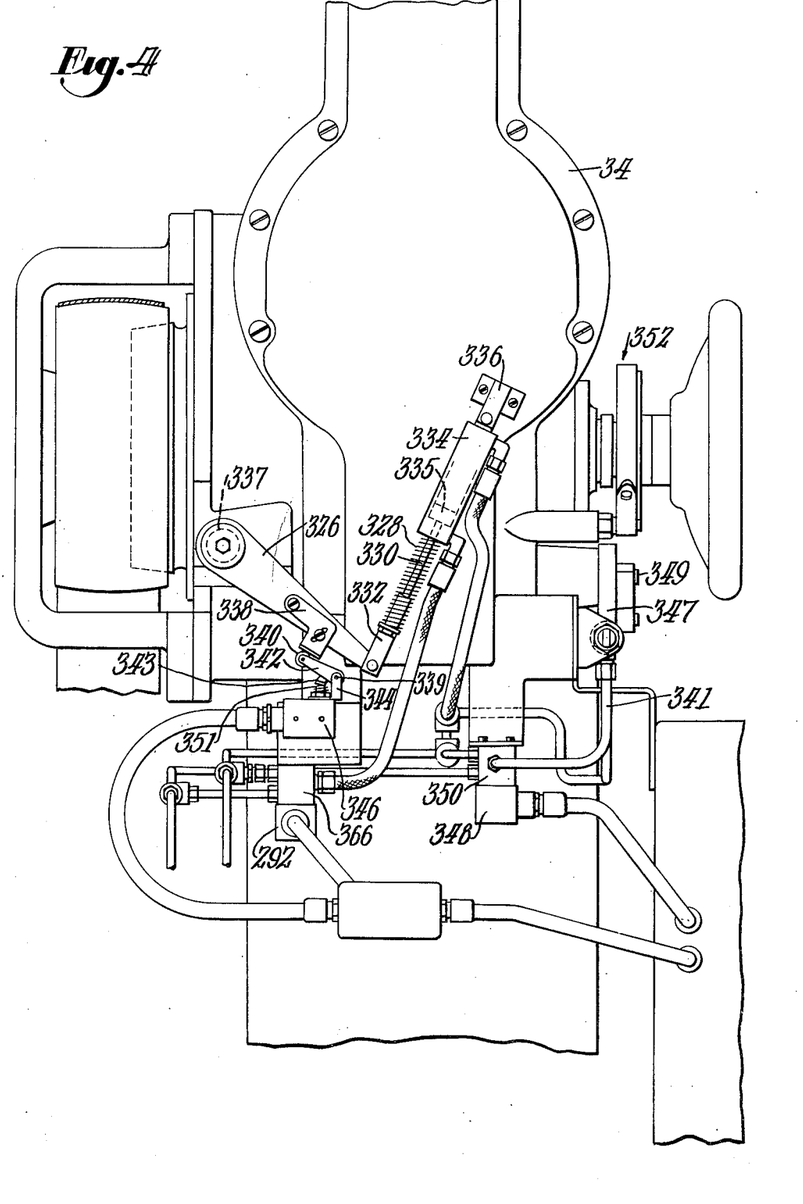
FIG. 4 is an enlarged rear elevation illustrating parts of the operating mechanism in the upper portion of the machine.

The operator now depresses a plunger 294 (FIG. 1) to cause the operation of the cam shaft. A pair of heel end wipers 296 (FIG. 3) is actuated by a cam 355 (FIG. 2) constructed to cause the wipers to advance and to close and to dwell in their closed position. In their closing movement the wipers operate to wipe the lasting margin of the upper in over the insole on the plate 40. The train of mechanism through which the cam 355 operates the wipers is illustrated and described in the Jorgensen Patent No. 2,059,241, hereinbefore referred to. As the wipers come to the limit of their overwiping movement, the wiper carrier 298 at the left end side of the machine engages a screw 300 in the right end portion of a lever 302 fulcrumed at 304 in a fixed bracket 306. At its left end portion the lever carries a screw 308 which closes a microswitch 310 to energize a solenoid 312 which actuates a valve 314 to open the upper portion of the jack cylinder 116 to exhaust. The operation of the microswitch 310 also energizes a relay coil 372 to open normally closed contacts 370, thus to de-energize the solenoid 280. Thereupon, a spring 374 shifts the valve 282 into its position illustrated in FIG. 24, thus to open the lower portion of the cylinder 184 to pressure and the upper portion to exhaust in order to retract the holddown member 174. Immediately after the operation of the microswitch 310 a screw 316, carried by the left end portion of the lever 302, operates a microswitch 318 to energize a solenoid 320 which actuates a valve 322 to cause an increase of pressure in the lower portion of the cylinder 116. A pressure of 1,000 p.s.i. has been found satisfactory for operating on most types of shoes. The upward pressure applied to the jack causes the overwiped margin of the upper, together with the flange of the counter and the lasting margin of the lining to be pressed firmly against the margin of the insole. Tack driving mechanism common to machines of this type is then operated to tack the upper materials to the insole, the tacks being clenched against the insole supporting plate 40. The operation of the tack driving mechanism closes a microswitch 324 to energize the solenoid 292 which in turn shifts a valve 366 to pressurize the lower end portion of a cylinder 334, FIG. 4, thus to operate a piston 335 mounted in the cylinder. Extending downwardly from the piston is a rod 330 which is pivotally connected to the free end portion of an arm 326 fixed to a shaft 337. The operation of the piston 335 above described, swings the arm 326 upwardly, thus to rotate the shaft 337 in a counterclockwise direction, as seen in FIG. 4. The rotation of the shaft operates an eccentric (not shown) to cause the clutch elements to be disengaged. The construction and operation of the clutch and its associated parts are described in the Jorgensen Patent No. 2,059,241, hereinbefore referred to. The upward movement of the arm 326 disengages a bracket 338 carried by the arm from a roll 340 mounted at the free end of an arm 342, thus liberating the arm for upward movement on a fulcrum 339 in a fixed bracket 344. The liberation of the arm 342 permits a spring 351 to impart upward movement to a plunger 343 mounted in and projecting upwardly from the housing of a microswitch 346. Upon the upward movement of the plunger, the microswitch closes, thus energizing a solenoid 348, thereby to shift a valve 350 in order to admit pressure fluid into a tube 341. Referring to FIG. 2, the pressure fluid flowing through the tube 341 pressurizes the left end portion of a cylinder 343 causing the piston therein to move to the right, as seen in FIG. 2, to bring a head 345 on the piston rod to bear against the lower portion of a lever 347 freely mounted on a shaft 349. The counterclockwise movement imparted to the lever 347 by the operation of the piston causes the application of a brake 352, thereby arresting the rotation of a worm shaft 353 which actuates the cam 355.

The operation of the microswitch 324 also serves to start a chronometer or time switch 354 which measures the duration of the application of upward pressure against the work supporting assembly by the operation of the piston 114 (FIG. 5). The operation of the microswitch 324 also energizes a coil 356 to close a pair of contacts 358, thus to establish a holding circuit for maintaining the operation of the time switch. Upon the expiration of a pressure period determined by the adjustment of the time switch, said time switch causes a pair of contacts 360 to open, thus to deenergize the solenoid 320, thereby to establish low pressure beneath the jack piston 114. The opening of the contacts 360 also de-energizes the solenoid 312 to permit a spring 362 (FIG. 24) to shift the valve 314, thereby to cause the application of fluid pressure to the top of the piston 114, thus moving the work supporting assembly downwardly into its rest position relatively to the jack 32. The normally open switch 290 now returns to its open position, thus de-energizing the solenoid 292 and permitting a spring 364 (FIG. 24) to shift the valve 366, thus opening the lower portion of the cylinder 334 (FIG. 4) to exhaust to permit a spring 328 surrounding the rod 330 to swing the arm 326 in a clockwise direction, thus to cause the clutch elements to be reengaged and the brake 352 to be released. The operation of the cam 355 (FIG. 2) after the re-enegagement of the clutch causes the tack driving means to be withdrawn and the wipers 296 (FIG. 3) to be retracted. Means operated by the cam then causes the disengagement of the clutch and the application of the brake to terminate the power cycle of the machine.

After the termination of the power cycle, the operator swings the hand lever 266 forwardly to cause the heel band to be released from the shoe upper. Thereupon, the hand lever 170 is depressed to disengage the jack retaining pawls whereupon the jack is swung forwardly into its rest posiiton illustrated in FIG. 2 by means of the handle 132.

Figure 16:
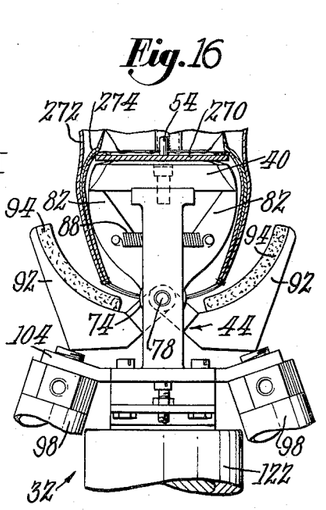
FIG. 16 is a front elevation of the upper portion of the jack with an upper, counter and insole shown in section on the line XVI—XVI of FIG. 15.

Referring to FIG. 1, the operator now swings a hand lever 368 forwardly to shift the valve 277, thereby to cause the jaws 92 (FIG. 16) to swing outwardly into their open position in order to permit the removal of the assembled shoe parts from the supporting plate 40.

Having thus described my invention, what I claim as new and desire to secure by Letters Patent of the United States is:

1. In a machine for shaping the heel end portions of shoe uppers off the last, a support for mounting any one of a plurality of insole supporting plates and a plurality of members mounted on the support, said members being so contoured that they form with a plate on the support means defining a cross sectional contour of the heel end portion of a shoe upper.

2. In a machine for shaping heel end portions of shoe uppers off the last, a plate defining the peripheral contour of the heel end portion of an insole, a support for the plate, and a plurality of members mounted on the support, the edge face of the plate and the outer faces of said members being contoured to form a shape corresponding to an inner cross sectional contour extending heightwise of the heel portion of a shoe upper.

3. In a machine for shaping heel end portions of shoe uppers off the last, a plate defining the peripheral contour of the heel end portion of an insole, a support for the plate and a plurality of members mounted on the support, the edge face of the plate and the outer faces of said members being contoured to form a shape corresponding to an inner cross sectional contour of the heel portion of a shoe upper, and means for bringing a shoe upper into intimate contact with the edge face of the plate, and means for bringing the upper into intimate contact with the outer faces of said members.

4. In a machine for shaping heel end portions of shoe uppers off the last, a plate defining the peripheral contour of the heel end portion of an insole, a support for the plate, a plurality of members mounted on the support, the edge face of the plate and the outer faces of said members being contoured to form a shape corresponding to an inner cross sectional contour of the heel portion of a shoe upper, a heel band for bringing a shoe upper into intimate contact with the edge face of the plate and presser members for bringing the upper into intimate contact with the outer faces of said members.

5. In a machine for shaping heel end portions of shoe uppers off the last, a plate having a peripheral contour defining the shape of the heel end portion of an insole, a support on which the plate is mounted, a plurality of members mounted on the support, the edge face of the plate and the outer faces of said members being contoured to form a shape corresponding to an inner cross sectional contour of the heel end portion of a shoe upper, a heel band for clamping the upper against the edge face of the plate, a flexible actuator arranged about the heel band, a spacer between the heel band and the actuator, said spacer between the heel band and the actuator, said spacer being so constructed and arranged that its inner edge face is in intimate contact with the heel band while its outer edge face, which is generally circular when the heel band is closed upon a shoe upper mounted on the plate, is engaged by the actuator, means for causing the actuator to advance the heel band into clamping engagement with the upper, and presser members for bringing opposite side portions of the heel end of the upper into intimate contact with the outer edge faces of the members mounted on the support.

6. In a machine for shaping heel end portions of shoe uppers off the last, a plate having a peripheral contour defining the shape of the heel end portion of an insole, a support on which the plate is mounted, an inner form arranged to engage the back line portion only of a shoe upper in the machine and a plurality of members positioned within the upper and contoured to form with the plate means defining a cross sectional contour of the heel end portion of the upper extending heightwise thereof.

7. In a machine for shaping heel end portions of shoe uppers off the last, a plate having a peripheral contour defining the shape of the heel end portion of an insole, an inner form depending from the plate and arranged to engage the back line portion only of a shoe upper in the machine, a support on which the plate is mounted and a plurality of members mounted on the support, said members being so contoured that they form with the plate means defining a cross sectional contour of the heel end portion of the upper extending heightwise thereof.

8. In a machine for shaping the heel end portions of shoe uppers off the last, a plate for supporting the heel end portion of a loose insole, an inner form arranged to engage the back line portion only of the inner surface of a shoe upper, a pair of jaws disposed to engage the inner and outer surfaces respectively of the upper at one side of its heel portion, said jaws extending heightwise of the upper from the top edge substantially more than half the distance to the overlasting margin, said jaws being characterized by the concavo-convex structure of their gripping surfaces defining a predetermined cross sectional curvature of the heel end portion of the upper and means for moving the innermost of said jaws into a position of conformity with said plate.

9. In a machine for shaping the heel end portions of shoe uppers off the last, a plate defining the peripheral contour of the heel end portion of an insole, the edge face of said plate having a contour complemental to a portion of the interior contour of the heel end portion of a shoe, a heel band for clamping a shoe upper against the edge face of the plate and a pair of jaws extending heightwise of the upper at one side of its heel portion and arranged to engage inner and outer surfaces respectively of a section of the upper extending from its top line to that portion engaged on the inside by the plate and on the outside by the heel band, and means for urging the innermost of said jaws into a position determined by its engagement with said plate, in which position said jaw cooperates with the edge face of the plate to define a contour of the upper extending from the top line to the feather line.

10. In a machine for shaping the heel end portions of shoe uppers off the last, a plate having a peripheral contour defining the shape of the heel end portion of an insole and an edge face contour defining the shape of an area of the heel end portion of a shoe upper adjacent to the lasting margin, and a pair of arms shaped to define a heel end contour of the upper extending from the plate engaging area to the top line of the upper.

11. In a machine for shaping the heel end portions of shoe uppers off the last, a plate having a peripheral contour defining the shape of the heel end portion of an insole and an edge face contour defining the shape of an area of the heel end portion of a shoe upper adjacent to the lasting margin and a pair of hinged arms shaped to define a heel end contour of the upper extending from the plate engaging area to the top line of the upper, the plate having formed therein, abutment surfaces for determining the positions of the arms, respectively, relatively thereto.

12. In a machine for shaping the heel end portions of shoe uppers off the last, a plate having a peripheral contour defining the shape of the heel end portion of an insole and an edge face contour defining the shape of an area of the heel end portion of a shoe upper adjacent to the lasting margin and a pair of arms shaped to define a heel end contour of the upper extending from the plate engaging area to the top line of the upper, and a pair of presser members for bringing the upper into intimate contact with the arms.

13. In a machine for shaping the heel end portions of shoe uppers off the last, a plate having a peripheral contour defining the shape of the heel end portion of an insole and an edge face contour defining the shape of an area of the heel end portion of a shoe upper adjacent to the lasting margin and a pair of presser members shaped to define a heel end contour of the upper extending from the plate engaging area to the top line of the upper, said presser members being characterized by resilient upper engaging means so disposed that the presser members engage the upper progressively beginning at the top line and advancing toward the lasting margin.

14. In a machine for shaping the heel end portions of shoe uppers off the last, an upper supporting jack movable between a loading position and an operating position, a pair of arms mounted on the jack for movement toward and from each other, an insole supporting plate mounted on the jack and arranged to hold the arms against movement toward each other, a pair of presser members for clamping opposite sides of the heel end portion of a shoe upper against the arms, pressure fluid operated means carried by the jack and operable with the jack in its loading position to impart upper clamping movement to the presser members.

15. In a machine for shaping the heel end portions of shoe uppers off the last, a jack movable between a loading position and an operating position, a pair of arms mounted on the jack for movement toward and from each other on a common axis extending lengthwise of a shoe upper in the machine, means for urging the arms toward each other, an insole supporting plate carried by the jack and positioned between the free end portions of the arms to limit their movement toward each other, a pair of presser members mounted for swinging movement on said common axis to clamp opposite sides of the heel end portion of the upper against the arms and means carried by the jack and operable with the jack in its loading position to advance the presser members into upper clamping position.

16. In a machine for shaping the heel end portions of shoe uppers off the last, a jack movable between a loading position and an operating position, a pair of arms mounted on the jack for movement toward and from each other on a common axis extending lengthwise of a shoe upper in the machine, means for urging the arms toward each other, an insole supporting plate carried by the jack and positioned between the free end portions of the arms to limit their movement toward each other, a pair of presser members mounted for swinging movement on said common axis to clamp opposite sides of the heel end portion of the upper against the arms, means carried by the jack and operable with the jack in its loading position to advance the presser members into upper clamping position, means for moving the jack from its loading position to its operating position, and an actuator operable first to cause the advancement of the presser members into upper clamping position and thereafter to cause the movement of the jack from its loading position to its operating position.

17. A machine for shaping shoe uppers having in combination a jack mounted for angular movement between a loading position and an operating position, a work supporting assembly carried by the jack including a plate for supporting a loose insole, lasting wipers for wiping the lasting margin of a shoe upper over an insole mounted on the plate, a holddown for determining the wiping elevation of the insole, and means for elevating the plate to bring the insole into engagement with the holddown, said means including a pressure fluid actuated piston carried by the jack.

18. In a machine for shaping shoe uppers the combination with lasting wipers, of a jack characterized by a plate for supporting a loose insole, a holddown for determining the wiping elevation of the insole supporting plate, pressure fluid actuated means for advancing the holddown into operating position, and means for moving the plate upwardly to bring an insole on the plate into engagement with the holddown comprising a double acting hydraulic piston carried by the jack and characterized by the fact that the differential between fluid pressures above and below the piston causes an upward force against the plate weaker than the force applied to the holddown.

19. In a machine for shaping shoe uppers the combination with lasting wipers, of a jack characterized by a plate for supporting a loose insole, a holddown for determining a wiping elevation of the insole supporting plate, means for imparting overwiping movement to the wipers and causing them to dwell in their overwiped position, and means for imparting heavy upward pressure to the insole supporting plate during the dwell of the wipers thereby to effect a bedding of the overwiped margin of the upper upon the insole.

20. In a machine for shaping shoe uppers the combination with lasting wipers and means for advancing them, of a jack characterized by a plate for supporting a loose insole, a holddown for determining the wiping elevation of the insole supporting plate, pressure fluid actuated means for advancing the holddown into operating position, means for moving the plate upwardly to bring an insole on the plate into engagement with the holddown comprising a double acting hydraulic piston carried by the jack, a pressure fluid organization for the piston whereby fluid pressure is applied both above and below the piston to cause an upward force against the plate weaker than the downward force against the holddown, and means for causing the application of heavy upward pressure to the plate by the piston after the wipers have advanced thereby to effect a bedding of the lasting margin of the upper against the insole.

21. In a machine for shaping shoe uppers the combination with lasting wipers, of a jack characterized by a plate for supporting a loose insole and grippers for holding a shoe upper in determinate relation to an insole on the plate, pressure fluid operated means carried by the jack for closing the grippers, pressure fluid operated means for swinging the jack from a forwardly inclined loading position into a generally vertical position in which the plate is downwardly offset from its operating position, a manually operated actuator for first causing the grippers to close on the upper and thereafter causing swinging movement of the jack from its loading position into said vertical position, and pressure fluid operated means carried by the jack and operated by such movement of the jack for moving an assembly, including the plate and the grippers, upwardly into said operating position.

References Cited in the file of this patent

UNITED STATES PATENTS

| | | |
|---|---|---|
| 1,306,247 | Brock | June 10, 1919 |
| 2,059,241 | Jorgensen | Nov. 3, 1936 |
| 2,242,251 | Lancaster | May 20, 1941 |
| 2,293,244 | Duplessis | Aug. 18, 1942 |
| 2,354,686 | Jorgensen | Aug. 1, 1944 |
| 2,689,362 | Hill et al. | Sept. 21, 1954 |